United States Patent [19]

Price et al.

[11] Patent Number: 4,954,202
[45] Date of Patent: Sep. 4, 1990

[54] APPARATUS FOR MAKING V-GROOVE INSULATION

[75] Inventors: Donald Price; Frank Price; Charles M. Nelson, all of Houston, Tex.

[73] Assignee: Industrial Insulations of Texas, Inc., Houston, Tex.

[21] Appl. No.: 364,452

[22] Filed: Jun. 12, 1989

Related U.S. Application Data

[63] Continuation-in-part of Ser. No. 119,821, Nov. 12, 1987, Pat. No. 4,838,968.

[51] Int. Cl.$^5$ ............................................. B32B 31/18
[52] U.S. Cl. ...................................... 156/353; 83/176; 83/875; 156/64; 156/220; 156/268; 156/378; 156/516; 156/526; 156/575; 428/167
[58] Field of Search ................. 156/64, 220, 268, 378, 156/516, 523, 526, 575, 353; 83/176, 875; 428/167

[56] References Cited

U.S. PATENT DOCUMENTS

| | | | |
|---|---|---|---|
| 2,735,426 | 2/1956 | Claydon | 156/268 X |
| 3,730,031 | 5/1973 | Huttemann | 83/176 X |
| 3,969,868 | 7/1976 | Bainter et al. | 428/167 X |
| 4,139,669 | 2/1979 | Chang | 428/167 |
| 4,234,657 | 11/1980 | Bussey | 428/167 X |
| 4,608,902 | 9/1986 | Ivey | 83/875 |

Primary Examiner—Robert A. Dawson
Attorney, Agent, or Firm—A. W. Breiner

[57] ABSTRACT

An improved method and apparatus for making V-groove insulation is disclosed. More particularly, the device of the present invention relates to an endless track fabrication and cutting system whereby prefabricated, sectioned lengths of insulation material are formed into continuously grooved insulation sheets of readily variable dimensions. The system is automated.

51 Claims, 10 Drawing Sheets

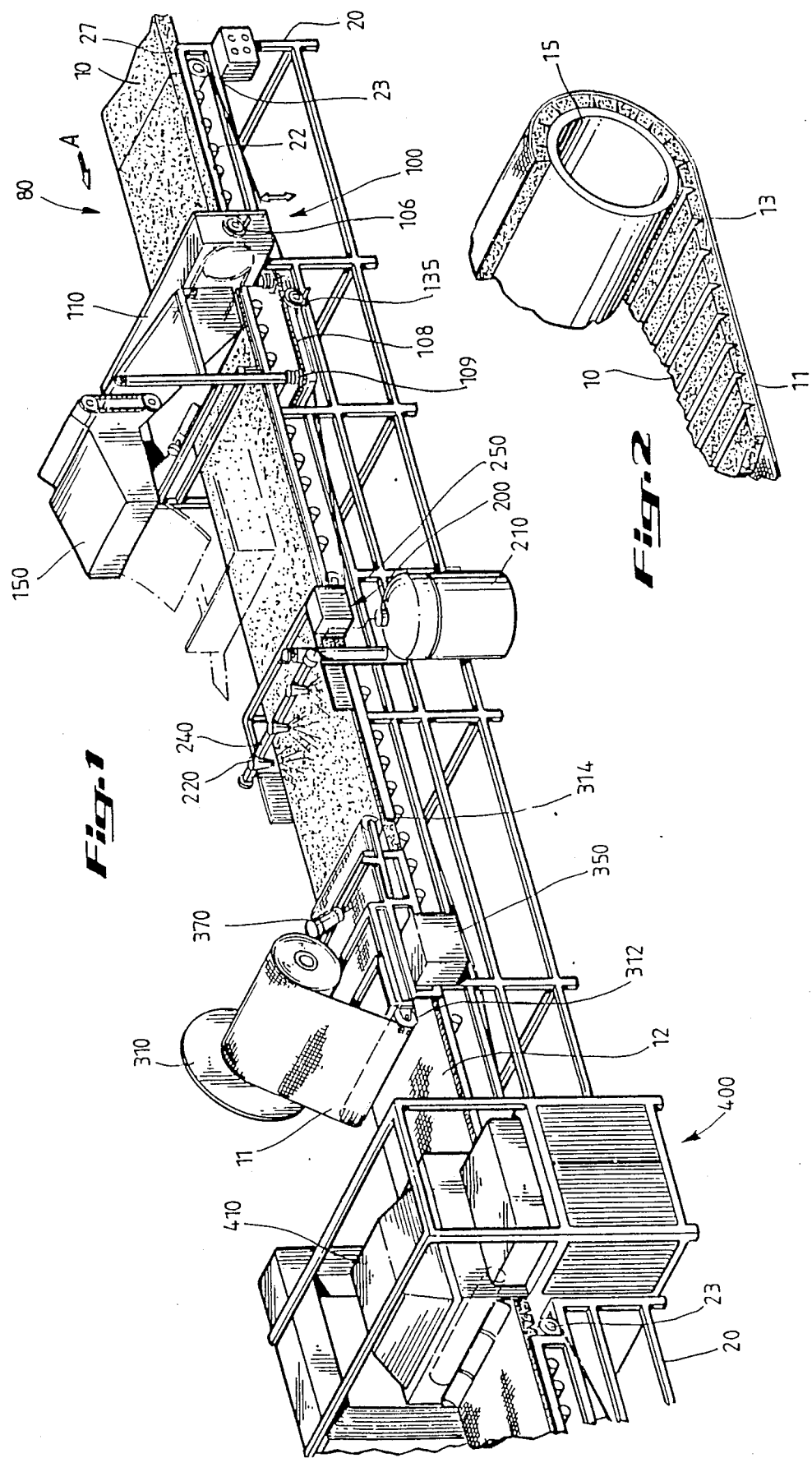

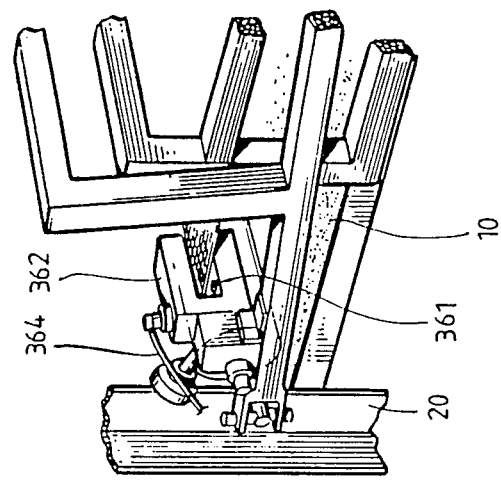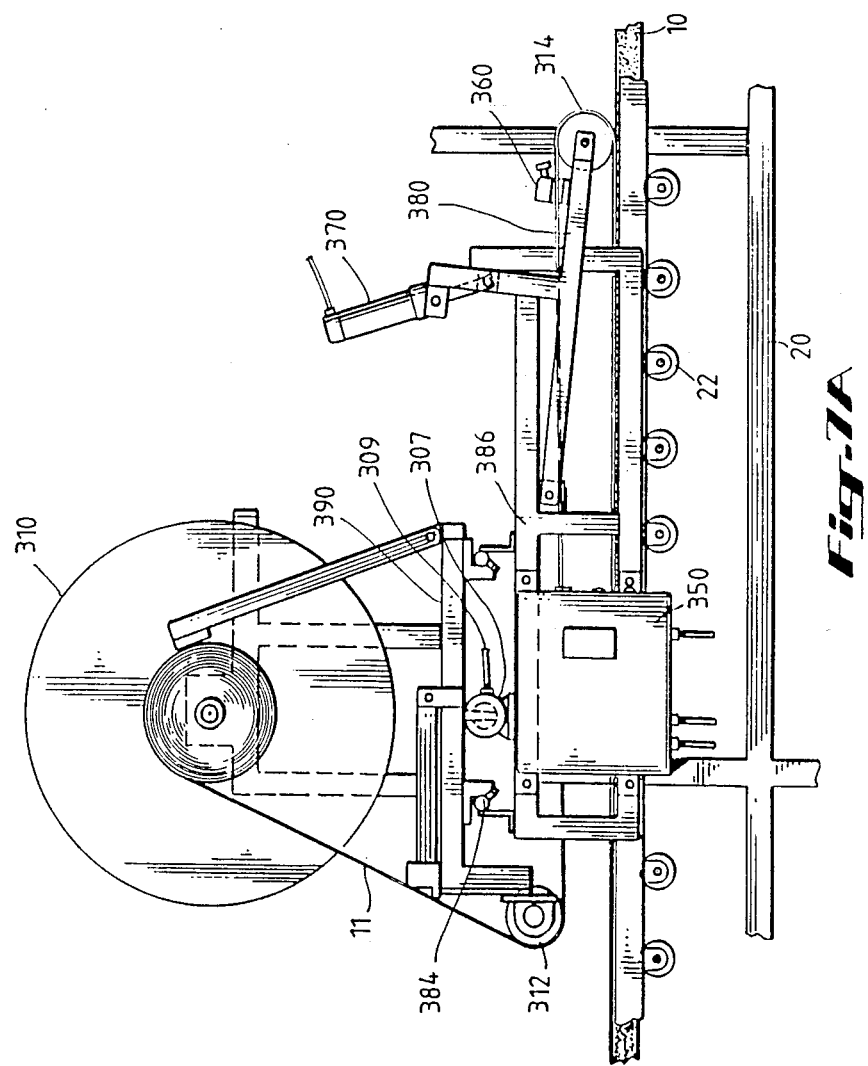

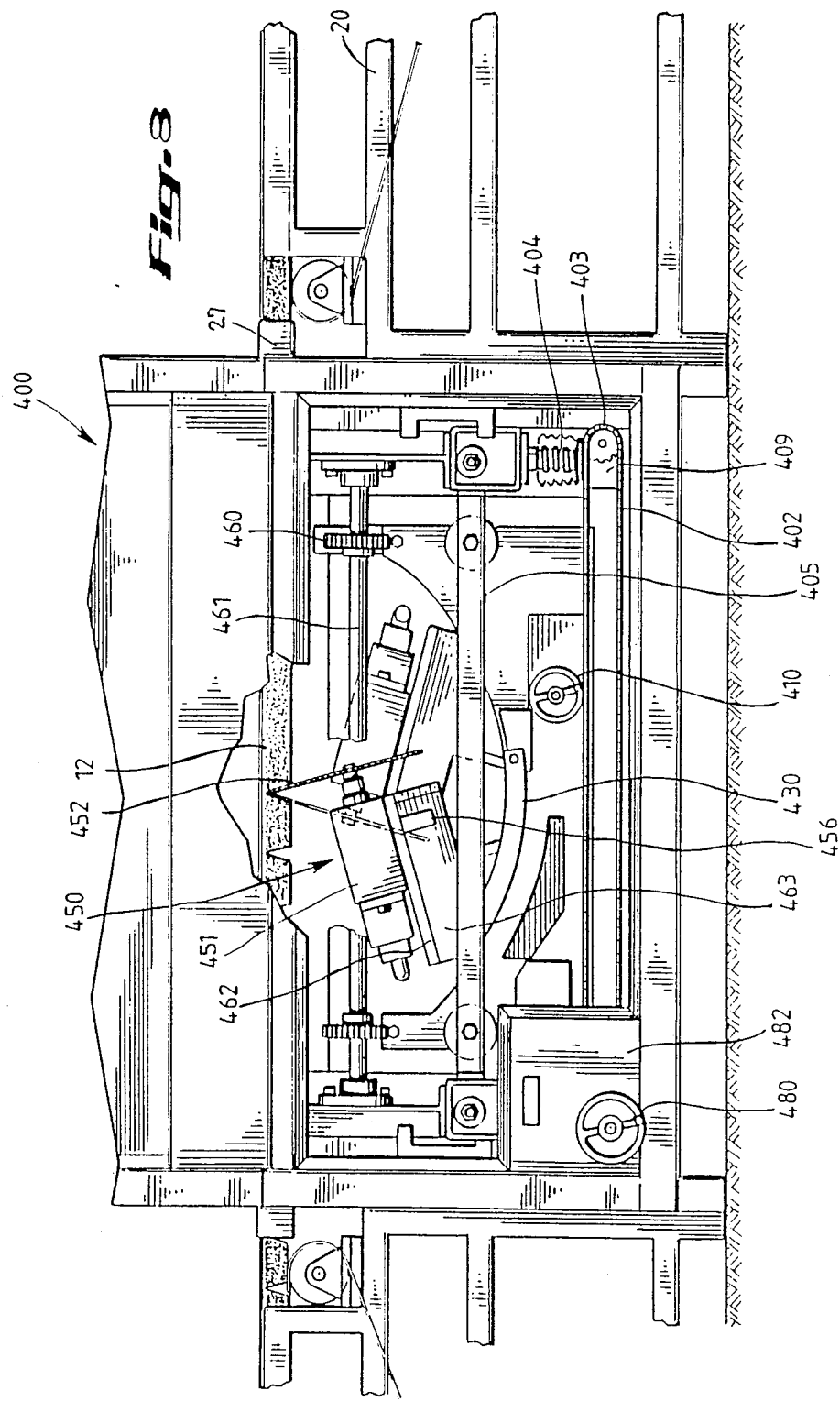

APPARATUS FOR MAKING V-GROOVE INSULATION

RELATED APPLICATION

The present application is a continuation-in-part of U.S. Ser. No. 119,821 filed Nov. 12, 1987, now U.S. Pat. No. 4,838,968 entitled "Apparatus And Method For Making V-Groove Insulation".

FIELD OF THE INVENTION

The present invention relates generally to a method and apparatus for making V-groove insulation. More particularly, the present invention relates to an endless track fabrication and cutting system whereby prefabricated, sectional lengths of an insulation material are formed into continuous, grooved insulation sheets of variable dimensions.

BACKGROUND OF THE INVENTION

In recent years, considerable advancements have been made in reducing radiative energy loss through the expanding use of a variety of insulation materials. In many commercial and industrial applications, such insulation materials are applied to the exterior of heat carrying members such as piping or duct work. Further, this insulation may be applied in a variety of fashions depending on the insulating effect required in a given application. In contemporary applications, two common insulation techniques include spray-on insulation and preformed insulation specially adapted to be fitted and secured around a particular sized thermal member.

Several disadvantages are associated with both of these insulation techniques. Once hardened on the pipe or duct work, spray-on insulation material generally does not allow for ready access to the heat carrying member, thus hindering its inspection and/or repair. Further, spray-on insulation often does not evenly adhere or bond to the heat bearing member, thus creating "hot" or "cold" spots. Spray-on type insulation can also trap salt bearing or corrosive fluids which result in eventual deterioration of the thermal member. Spray-on type insulation is also very sensitive to local environmental conditions, and is therefore successfully applied only within rigid wind, temperature and humidity parameters. Finally, spray-on insulation is messy in application and often aesthetically unappealing.

Disadvantages associated with preformed insulation techniques include the overall cost to individually form or mold a given insulation section to its intended application around the thermal member. For a given length and diameter pipe or duct, a specific dimension insulating section must be formed, this process is often time and energy intensive. Preformed insulation sections are also expensive from the standpoint of both storage and shipment. Further, preformed sections are not easily adapted to other applications and often poorly fit their original, intended application due to manufacturing tolerances.

As a result of these and other disadvantages, other contemporary insulation systems have evolved which utilize a flat section of insulation which has been notched or grooved to accommodate a given diameter circular pipe or duct. In utilizing such a grooved insulation system, a flat section of insulation may be wrapped around a pipe or circular duct such as to maintain an insulation coating of uniform thickness. The insulation is held in place by an appropriately sized band or jacket. When repair or inspection of the thermal member is required, the band or jacket is released and the insulation section may be readily removed.

The notched or grooved systems, however, while less expensive than the molded systems and more manageable than the spray-on systems, have still not been readily and inexpensively adaptable to the variety of pipe diameters and lengths found in actual commercial application. This deficiency has arisen as a result of the failure of the art to develop a high speed precision system capable of consistently forming a series of clean, V-grooves or notches in the insulation material while the material moves in an assembly-line like fashion. This failure has resulted in uneven notch or groove dimensions and, consequentially, uneven and often unacceptable performance in wrapped applications. Further, such systems have been unable to accurately and uniformly establish a desired thickness in the insulation sheet, thus further hindering its application around tubular piping and the like. Thus, while V-groove insulation has been less expensive to fabricate than preformed insulation, its performance and flexibility in actual application has been often less than satisfactory.

Prior art notching or grooving systems have also been hindered by the undesired and physically harmful formation of insulation dust caused by the notching or grooving process. In such processes, therefore, elaborate dust removal systems have been employed, thus increasing the overall size and cost of these systems.

Finally, most prior art systems have been unable to economically produce small scale custom or tailored applications due to the cost of modifying a given tool or mold. Thus, economical insulation sections or products were often limited to relatively large projects.

SUMMARY OF THE INVENTION

The present invention addresses the above noted and other disadvantages by providing a rapid, efficient, yet inexpensive method and apparatus for forming variable dimension sections of V-groove insulation adapted to form a compression fit around a given thermal member.

In a preferred embodiment of the invention, prefabricated, sectional lengths of insulation material, preferably mineral wool insulation material, are placed end to end on an endless track conveyor system. The thickness of these lengths is then modified or "planed" commensurate with the particular insulation requirements for a given application. This is preferably achieved by a band saw assembly disposed laterally across the conveyor track. After the sections of insulation are thus prepared to a desired thickness, a quick drying contact adhesive is evenly applied to the upper side of the insulation section. This adhesive secures a continuous length of a backing material to the sections. This backing material securely, yet flexibly holds the insulation sections in their abutted end-to-end relation so as to form a continuous integral sheet. This integral sheet is then passed over a cutting and grooving assembly situated below the conveyed sheet material, where a series of grooves or notches are formed in the sheet material's lower surface. The integral sheet may be cut into prescribed lengths after the grooving or notching operation.

The above-described process is preferably controlled via a microprocessor assembly. Thus the various and individual steps of planing, gluing, cutting, etc., are preferably coordinated so as to produce a constant flow of prescription length V-groove insulation material at the terminal, output end of the system. The microprocessor is programmed to control the operation of the multiple stations in a coordinated manner. The coordination of the stations' operations is based on the V-groove cutting operation. The cutting operation requires that the movement of the sheet material by the conveyor momentarily cease during the cutting operation to allow for a straight uniform cut. Accordingly, the operations of the other stations are coordinated with these momentary stoppages to provide for a timed operation of the multiple stations. The stoppages will be in a timed or stepped sequence based on the frequency of the cuts to be made in the sheet material.

In a preferred aspect, the present invention includes the design of a cutting apparatus. Preferably, the cutting apparatus includes a means for supporting the sheet material in the apparatus, a movable support means located beneath the sheet material support means which is capable of moving transversely beneath the support means, and a pair of saw assemblies adjustably mounted on the movable support means in an offset and inclined relationship to each other. The positioning of the pair of saw assemblies allows the saws to be operated in unison beneath the sheet material support means in order to form a cut in or sever the sheet material with the blades of the saw assemblies.

In one preferred embodiment of the cutting apparatus, the pair of saw assemblies are hydraulicly powered circular saw assemblies positioned along a relatively movable arcuate track in an offset relationship. In a second preferred embodiment, the cutting apparatus includes a pair of hydraulicly powered circular saw assemblies adjustably mounted in an offset relationship through the use of hydraulic cylinders on a movable unitary support means, such as a platform. The movable platform is driven by a flexible loop drive assembly, such as a chain, elastomeric belt or the like, along parallel tracks or rails formed in or positioned on the cutting apparatus side walls. These preferred arrangements allow the saws to be accurately positioned and adjusted to provide different angles or depths to the groove formed in or the severance of the sheet material.

The present invention offers a number of advantages over the prior art. One such advantage is the ability of the process and apparatus of the present invention to economically produce selected quantities of a prescription-sized V-grooved insulation, where the final insulation product is characterized by a series of consistently clean cut grooves or notches.

The present invention also offers the ability to quickly and precisely adjust the angle and depth at which a V-groove is cut in an insulation sheet, such that the final insulation product will maintain a precision compression fit over the pipe or duct to be insulated. In a preferred aspect, the present invention provides a continuous fabrication and cutting process without a heavy generation of insulation dust.

Yet another advantage of the present invention is the ability to closely control, regulate and modify the angulation and depth of V-grooves cut in the insulation sections, in addition to precisely controlling the spacing of these grooves.

BRIEF DESCRIPTION OF THE DRAWINGS

FIG. 1 is a perspective view of a preferred embodiment of the present invention.

FIG. 2 is a perspective view of the finished end product of the present invention as it may be wrapped around a thermal member.

FIG. 7A is a side view of the backing means as it may be situated relative to the conveyor track.

FIG. 7B is a detailed view of the photo cell sensor assembly of the backing means.

FIG. 8 is a side cut-away view of one preferred embodiment of the cutting and grooving means.

DESCRIPTION OF THE PREFERRED EMBODIMENT

Figure 3:
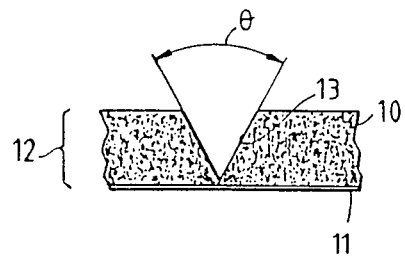
FIG. 3 is a side view of an aggregate insulation piece illustrating a V-cut groove or notch.

As illustrated in FIG. 1, the apparatus of the present invention is comprised of a combination of specialized assemblies or "stations", each disposed along, above or proximate to an endless track conveyor system. The conveyor system itself is generally comprised of an upright tubular frame 20 along the top of which are secured a plurality of rollers 22 or the like to form a bed 27. Flexibly disposed over these rollers 22 is conventional looped belt arrangement (not shown) driven by a motor through guide rollers 23 such that the material placed atop the system may be moved longitudinally down the frame 20 for further processing as shown by direction arrow A. The travel rate of the conveyor system is governed by a microprocessor system, which, as will be later described, also governs the placement and frequency with which V-grooves are cut in a given insulation section 10 or at which severance of the insulation section 10 occurs.

The components and operation of the present system is as follows. Beginning from the upstream end of the conveyor assembly, insulation sections 10 of a given, manufactured dimension, generally 1"-4" thick, are first placed on a loading area 80 where they are joined together with an adhesive in an end-to-end abutting relationship to form a continuous sheet. This continuous sheet is then automatically moved toward a planing means 100 along frame 20.

Figure 4:
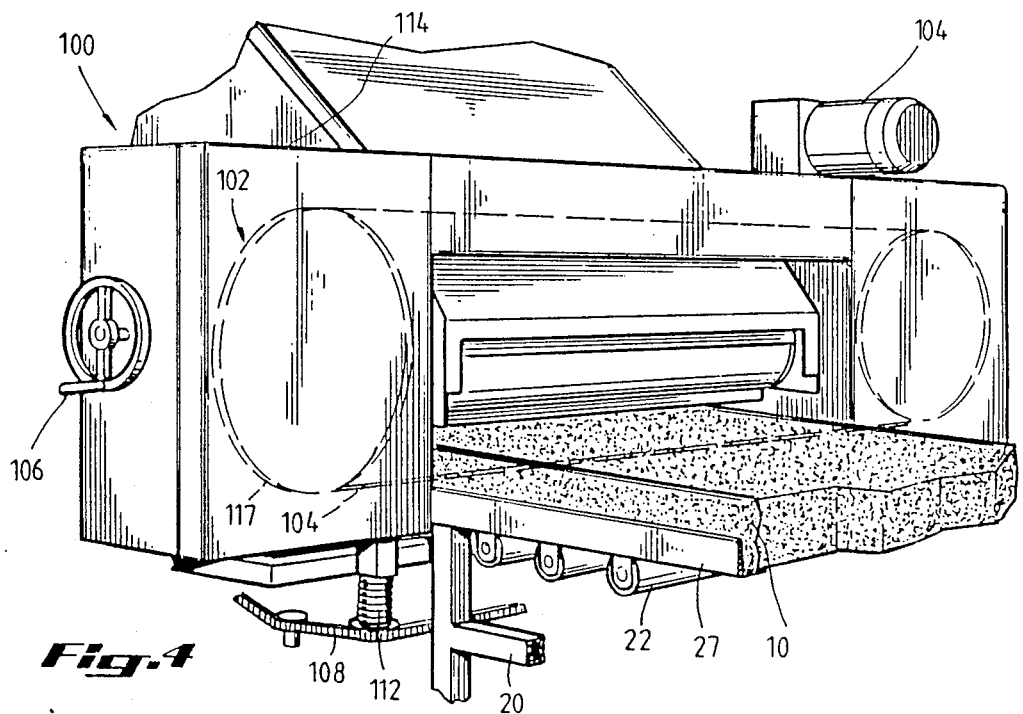
FIG. 4 is a perspective view of the planing means.
Figure 5:
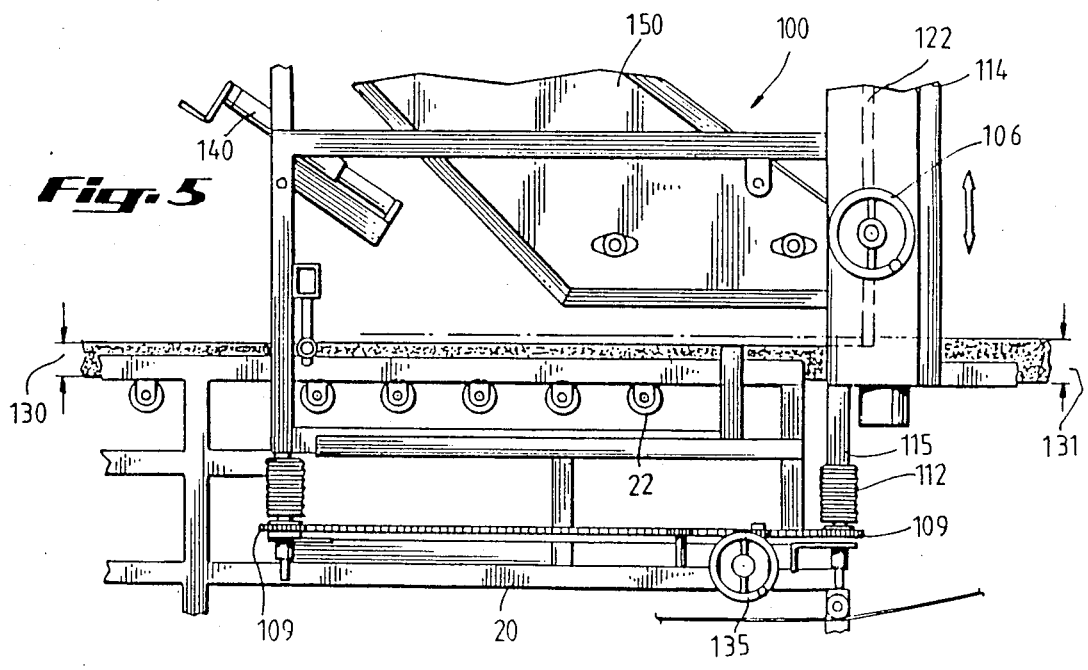
FIG. 5 is a side view of the planing means.

Specifically referring to FIGS. 4–5, the planing means 100 comprises a housing 114 situated above and connected to the frame 20. A band saw assembly 102 is laterally disposed in the housing 114 at a variable height above the frame bed 27 such that the saw blade 104 contacts the leading edge of a given insulation section 10 as it moves downstream. This blade 104 is disposed at a uniform height along its length above the bed 27 such as to establish a uniform and prescribed thickness in the section 10. The planing or cutting operation of assembly 100 is carried out while insulation sections 10 move downstream toward the next station. The operation of the planer is controlled by the microprocessor so that the planer's operation can be coordinated with the operation of the other stations in the system. The microprocessor can control the operation of the planer either secondarily through control of the conveyor which has its operation controlled by the microprocessor or primarily by having its drive means directly connected to and controlled by the microprocessor.

In a preferred embodiment, the planing means 100 utilizes a conventional band saw having 20" diameter drive wheels 117 around which is secured a 6 pitch ¾" wide, tooth-type blade 104. Drive wheels 117 are driven by a 2 horsepower 220 three phase electric motor (not shown) such that the blade 114 achieves a fixed operation speed. Tension in blade 104 may be modified via handwheel 106.

The vertical position of the saw blade 104 relative to bed 27 may be varied by manual movement of adjustment wheel 135. Wheel 135 is connected to height adjustment chain 108, such that movement of wheel 135 causes chain 108 to move in a longitudinal fashion about sprockets 109, which in turn are connected to adjustment supports 112 secured to frame 20. Supports 112 in turn, threadedly engage housing supports 115 via a female thread arrangement such that rotation of sprockets 109 results in a vertical movement of supports 115 relative to the frame 20. Hence, by movement of hand wheel 135 the housing 114 may be uniformly raised or lowered relative to the bed 27 so as to establish a desired thickness 130 in an insulation section 10 having a manufactured thickness 131. The housing 114 may also be structured to be adjusted automatically by remote means, such as the microprocessor.

In a preferred embodiment, the planing assembly 110 is provided with an exhaust or vacuum system to remove dust and small insulation particulates generated as a result of the planing process. This system generally includes a conventional exhaust and ventilation system situated inside the housing 114 and operative via vacuum outlet. Due to the construction of housing 114, and the minimal agitation action of saw assembly 102, dust and particle generation are both minimized and contained with any generation being removed to an external collection bin or reservoir (not shown).

A material removal system 150 may also be attached to the housing 114 downstream from the saw assembly 102 itself such that the upper, undesired portion of insulation material planed from the main insulation section 10 may be removed for disposal via a conveyor or other means.

Figure 6A:
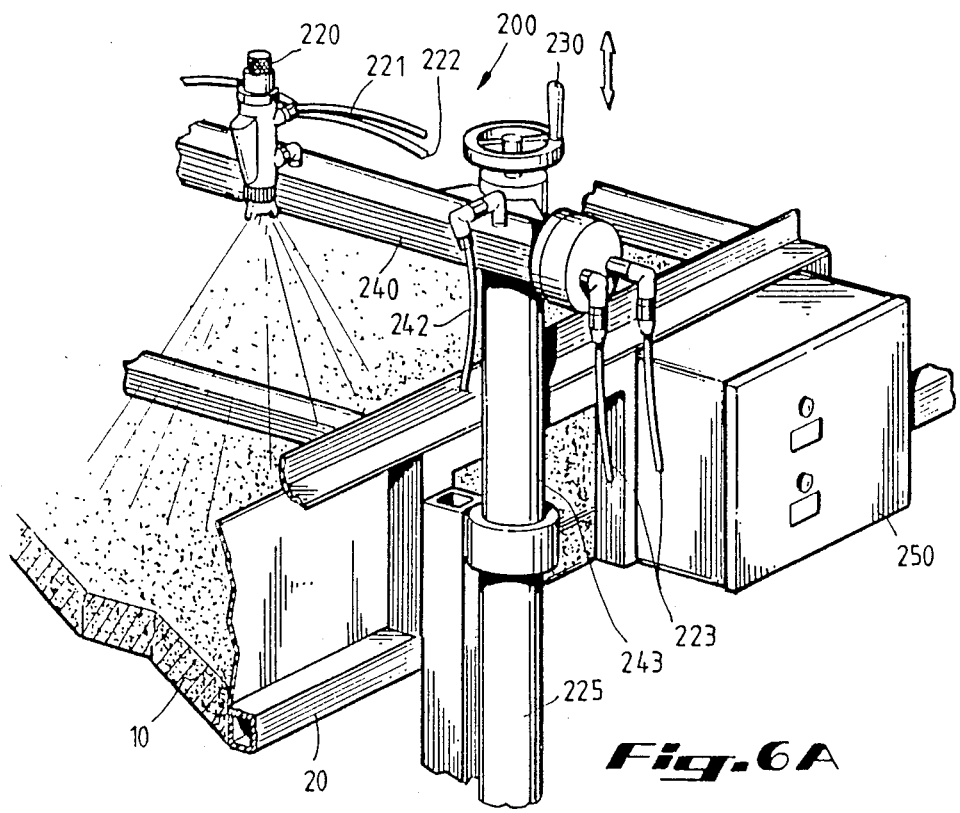
FIG. 6A is a perspective cut-away view of the spraying or gluing system.
Figure 6B:
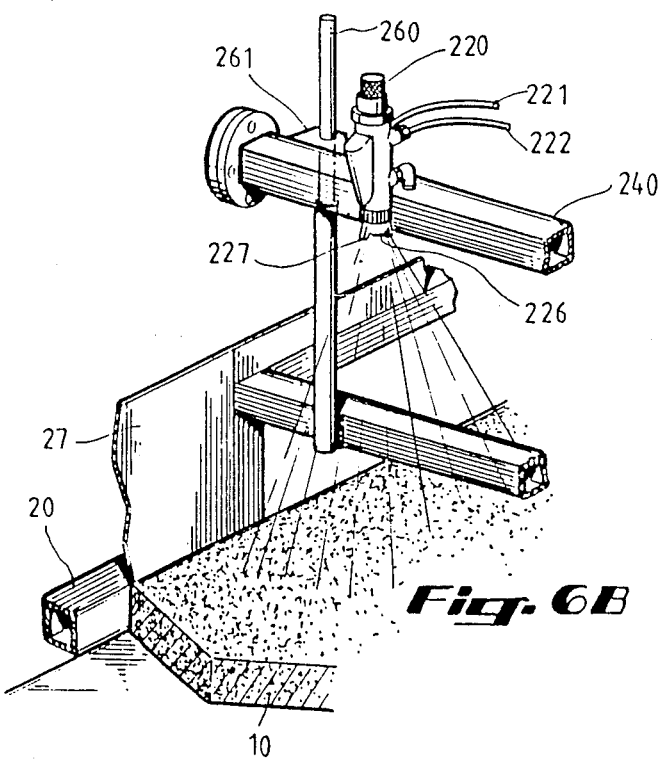
FIG. 6B is a detailed perspective view of the spraying system illustrating a spray nozzle.

When insulation sections have been planed to a desired thickness 130, the sections 10 are automatically conveyed downstream to a spraying assembly 200. Referring specifically to FIGS. 6A–B, the spraying assembly 200 generally comprises upright supports 243 attached to the frame 20. Support 243 is welded to a support arm 240. Guide post 260 protrudes in guide sleeve 261 to prevent rotational movement of assembly 200.

In the system 200, a series of spray nozzle assemblies 220, such as a Bink's series 61 spray gun assembly, are fixedly secured to the support arm 240 such that adhesive material discharged through the nozzles may be evenly applied over an insulation section 10. In FIG. 6A, one or more connectors 242 connect the nozzle assembly 220 with a pressurized adhesive reservoir 210. (See FIG. 1.) A hydraulic connector line 223 is disposed through the support arm 240 in a looped arrangement to act as a heat source to prevent adhesive introduced into arm 240 from becoming too viscous during cold operation.

Also attached to nozzles 220 are a series of air connectors 221 and 222. Connector 221 is linked directly to nozzle 220 to provide for adhesive atomization onto the work surface through apertures 227 arranged at the periphery of nozzle tip 226. Liquid adhesive is pumped through the inner part of this nozzle tip 226, such that the combination air and adhesive flow results in a fan shaped propagation of adhesive over insulation section 10.

Connector 222 is used to provide a source of air to activate nozzle 220 during forward movement of the insulation section 10 upon an electric signal from the microprocessor. This electric signal is used to open a solenoid valve which then allows air pressure to trigger the spraying action of the nozzle 220. Solenoids and their related controls are contained in housing 250. Accordingly, the microprocessor controls the spraying and non-spraying action of the spray station to provide an even uniform adhesive application on the upper surface of the insulation material.

The exact distribution and concentration of the adhesive may be varied by altering the height of the support arm 240 and hence the nozzles 220 relative to the surface of the insulation section 10. This variable height may be adjusted by movement of handle 230 which operates as a screw jack to move upright support 243 vertically relative lower member 225.

As an even distribution of a quick drying adhesive is being applied to the upper surface of the planed insulation section 10, the section 10 is being moved downstream to a backing means 300. The backing means 300 preferably includes a support frame 386 rigidly secured to and suspended above the frame 20. Slidably secured to the frame 386 about tracks 384 is a spool support structure 390 adapted to rotatably accommodate a spool 310 of a backing material 11. Rotatably attached at the rear, downstream extent of the support frame 386 is a first guide roller 312 which is of a size sufficient to accommodate backing 11 of variable widths. Hinged at the frontal extent of the support frame 386 is an application roller arm 380 which accommodates an application roller 314.

A pneumatic linear cylinder 307 is disposed between support frame 386 and spool support structure 390. Cylinder 307 is operated by control 350 via a photo sensor. Upon activation of cylinder 307, the preferred backing is aligned with the edge of insulation section 10.

In operation, the backing material 11 is paid off of the spool 310 where it is tensioned between rollers 312 and 314 and it then engages the prepared surface of the insulation section 10. In this fashion, a continuous length of backing material 11 is applied over the abutting sections 10 so as to form a continuous, integral sheet 12.

To avoid expensive and time consuming trimming operations, it is desired that the backing material 11 be exactly juxtaposed over the insulation material 10 before contact between the two surfaces is made. Due to inherent irregularities associated with different factory winding processes, however, not all backing materials will perform similarly in tensioned application, thus creating a series of wrinkles which may result in less than satisfactory adhesion of material 11 to insulation 10. Similarly, some backing materials may arrive from the factory "staggered" or unevenly wound on the roll. Due to these and other problems, therefore, an alignment apparatus is thus needed to ensure even distribution and alignment of the backing 11 on the insulation sheets 10.

In the present invention, this alignment is preferably accomplished electronically via an electric eye guide means 360 such as a model No. 57044H/H1116 electric eye and control component as available from Hydralign, Inc. Referring to FIGS. 7A-7B, the electric eye guidance assembly 360 is situated on the upper portion of the application roller arm 380 such as to sense the edge of backing material 11 tensioned between rollers 312 and 314. The electric eye and receptor 361 itself is disposed within the inner extent of a U-shaped housing 362 such that backing 11 tensioned between rollers 312 and 314 passes through the housing 362. As described, the eye and receptor unit 361 is electrically coupled to inducer 307 thus resulting in a transverse adjustment of the spool frame 390 about tracks 384 so that precise alignment and fixation of the backing 11 to sections 10 may be automatically accomplished.

The backing material 11 itself is preferably comprised of a flexible mylar or kevlar composition such as a Hypolon ® TGH-100 laminate made by Alpha Associates, Inc. of Woodbridge, N.J. or a foil scrim (FSK) or all service jacket (ASJ) as manufactured by LAMTEC Corp. of Flanders, N.J..

Once backing 11 has been affixed to abutting insulation section 10, the integral insulation sheet 12 is moved further downstream where it finally engages the cutting and grooving assembly 400. This assembly 400 is preferably comprised of two independent saw assemblies adjustably mounted on a movable or slidable support means disposed beneath the level of the sheet material on bed 27 such that a variety of differently configured V-grooves may be quickly and precisely produced in the underside of the integral sheet 12 or integral sheet 12 may be severed to produce separate sheets of grooved insulation material of predetermined lengths. As described further below, the cutting apparatus is controlled by the microprocessor located in electrical enclosure 531. The microprocessor controls the activation of the apparatus and determines the spacing and type of cut made in the sheet material. The number of the cuts necessarily determines the spacing of the cuts.

Figure 10:
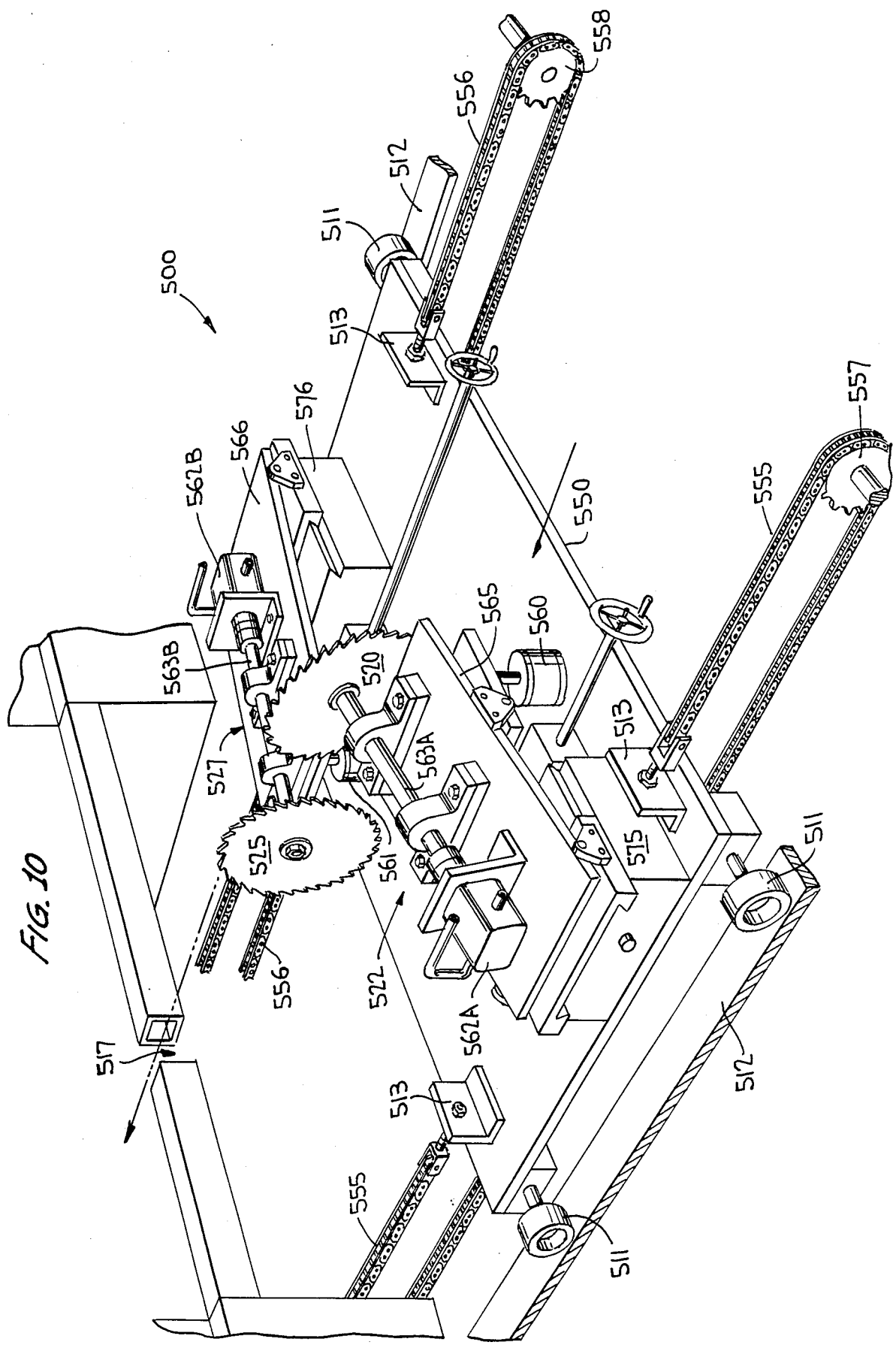
FIG. 10 is a perspective view, of a second preferred embodiment of the cutting apparatus of the present invention.
Figure 11:
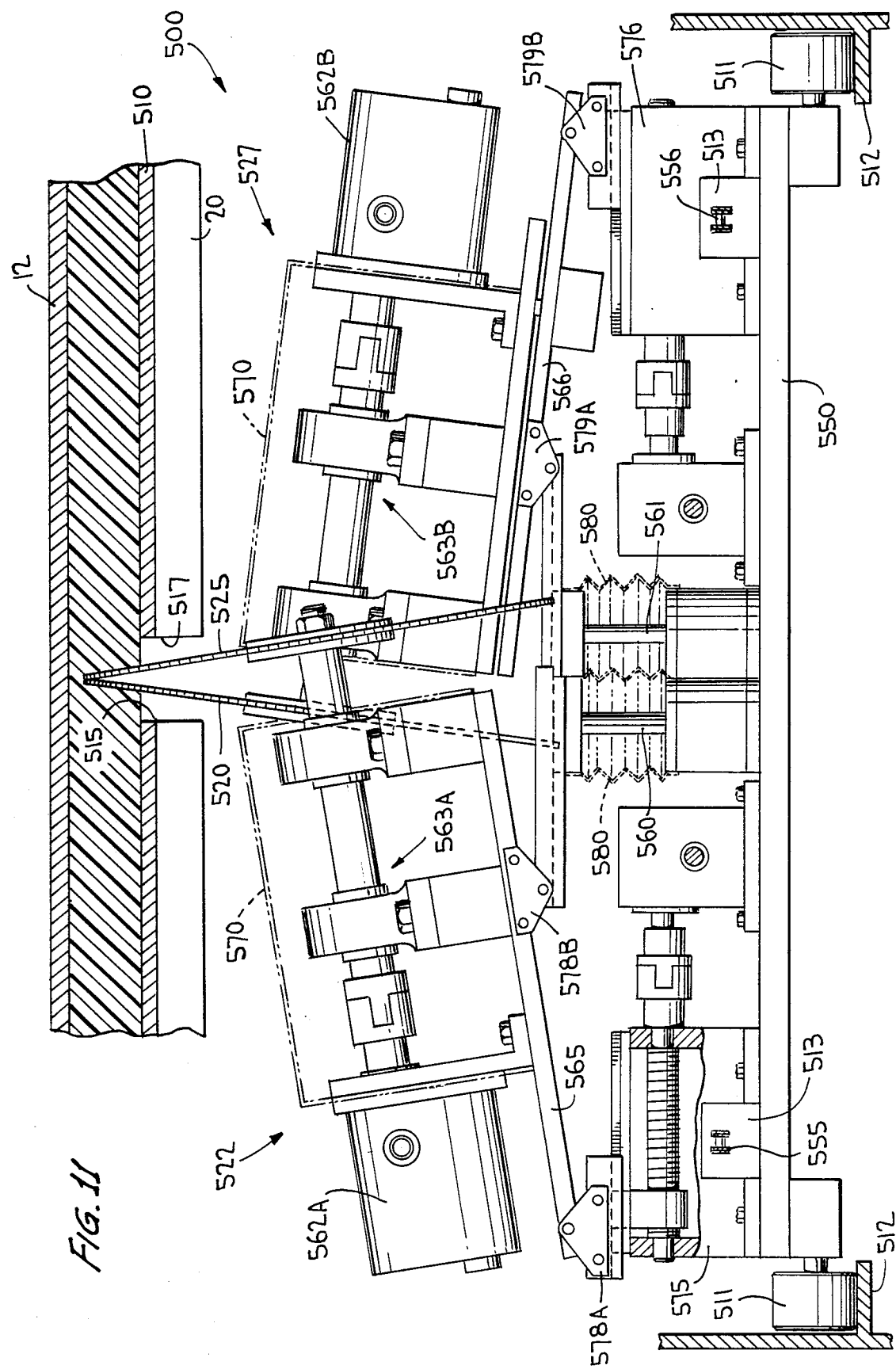
FIG. 11 is a side view of a pair of saw assemblies of the embodiment shown in FIG. 10 positioned on a movable support means or platform.
Figure 12:
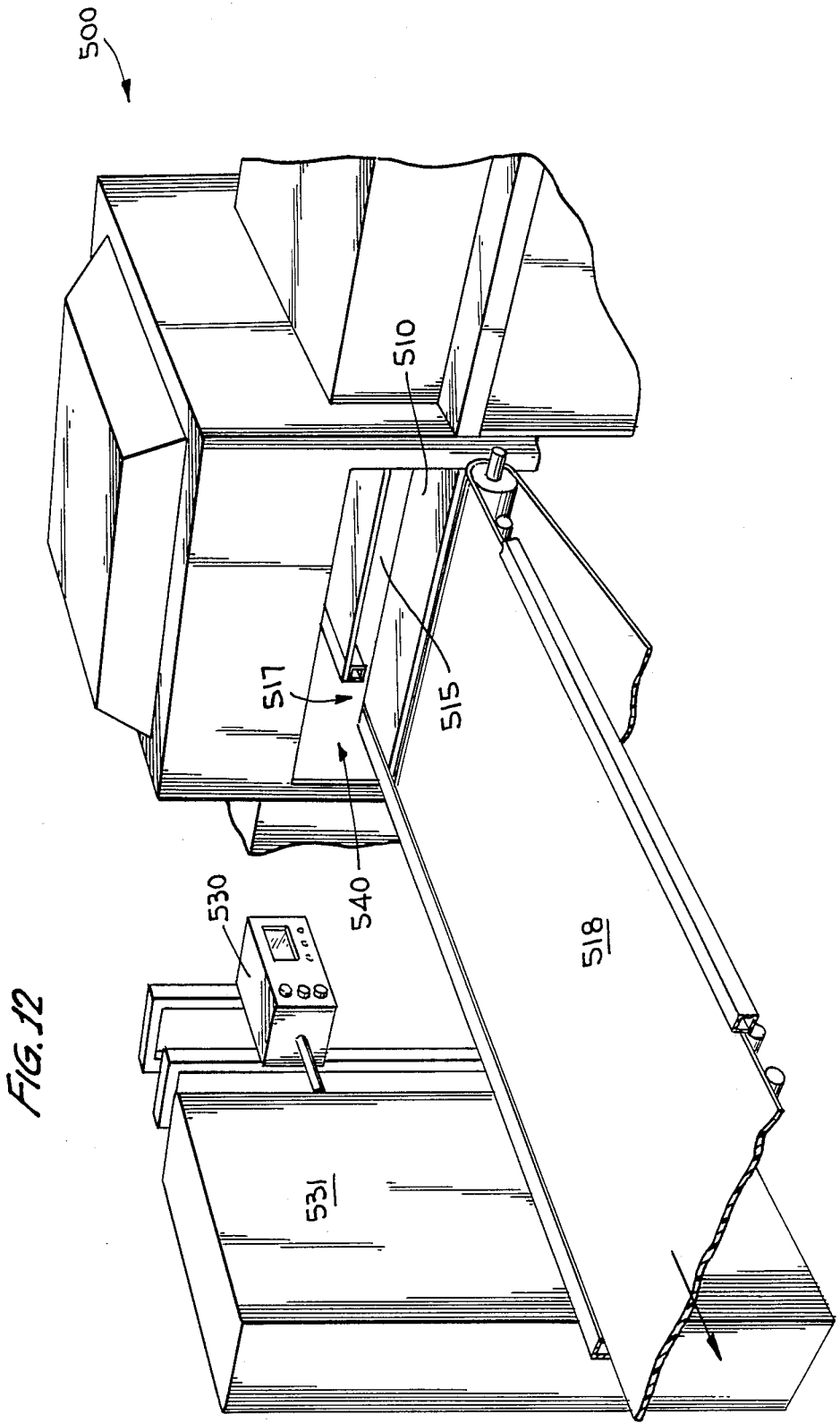
FIG. 12 is a perspective view of the support means within the cutting apparatus as viewed through the exit opening of the cutting apparatus, and the discharge conveyor which picks up the discharged cut sheet material from the support means within the cutting apparatus.

Integral sheet 12 is fed into cutting and grooving assembly 400 by conveyor rollers 22. As described earlier, the conveyor feed is controlled by the microprocessor. Sheet 12 moves from the conveyor onto a platform, such as denoted by 510 in FIG. 12, within assembly 400. An opening 515 is formed in the platform in the area above the pair of saw assemblies contained in the cutting assembly 400. The saw blades of the saw assemblies project and move through this opening when they cut a groove in the bottom of the integral sheet 12 or sever sheet 12 to form individual sheets of predetermined length. The opening in the platform is wide enough to accommodate the saw blades but does not have to be overly wide since the placement of the cut in the sheet material is controlled by the conveyor movement which is in turn controlled by the microprocessor. The support means for the sheet material 12 in the cutting assembly has an opening 517 in its side, as shown in FIGS. 10, 11, and 12, coextensive with the platform opening 515 to allow for the movement of the saw blades beyond the perimeter of integral sheet 12. This allows for free movement of the conveyed sheet and a complete widthwise cut in the sheet material. This feature is described further below in relation to preferred cutting apparatus embodiments. A discharge conveyor 518, as best shown in FIG. 12, receives the cut and grooved insulation sheets as they emerge from the cutting apparatus. During the cutting operation, the feed conveyor 27 stops thereby causing the movement of sheet material in the cutting apparatus to stop and allows a cut to be formed in or the severance of the sheet material. Following the cut, the conveyor movement is again initiated causing incoming sheet material to push the cut sheet material out of the cutting apparatus so that it can be picked up by the discharge conveyor. The stepping operation of the feed conveyor, i.e., the period of time the conveyor is stopped and the length of time between stops, is controlled by the microprocessor. The discharge conveyor feed can also be controlled by the microprocessor.

One preferred embodiment of the cutting apparatus is shown in FIG. 8. Two hydraulicly powered circular saws 450 are fixedly positioned on arcuate tracks 430 in an offset relationship as shown. The combination circular saw 450 and track 430 forms a support or carriage which is transversely movable relative to the integral insulation sheet 12 by drive wheels 460 engaging drive chains (not shown). These drive wheels 460 are mounted on a drive shaft 461 which in turn translates the movement of a drive motor (not shown) to accomplish transverse movement of the carriage about the conveyor 27. As described above, each saw carriage is transversely movable to an extent beyond the lateral perimeter of the frame 20 such as to allow the insulation sheet 12 to progress after a given groove 13 is cut. The actuation of drive shaft 461 and hence the transverse movement of the saw carriages is governed by a microprocessor assembly (not shown in FIG. 8).

Since the saws 450 are offset as earlier described, both sides of a V-groove or notch 13 may be cut as the carriage moves transverse to the long axis of the frame 20. V-grooves of the insulation material cut from the underside of the sheet 12 fall downwardly into a collection area of assembly 400 where they are removed to a continuous belt conveyor which transports them to a vacuum removal system (not shown).

Referring to FIGS. 2, 3, and 8, the design of the grooving apparatus 400 allows a variety of different depth and angulation V-grooves to be created in a given integral insulation section 12. This versatility is essential since for each diameter thermal member 15, a different aspect insulation piece must be generated.

A number of adjustments are possible. The spacing at which the grooves are formed in the underside of the integral sheet 12 is precisely controlled via a programmable microprocessor assembly (not shown in FIG. 8). This assembly, is in turn, linked to the main drive motor of the conveyor system so as to regulate the rate at which the sheet of integral material 12 contacts cutting elements 452 of assembly 400.

The angulation of the V-groove 13 may be quickly modified by adjustment of the relative posture of arcuate tracks 430 on which are affixed said assemblies 450. Saw assemblies 450 are adjustably mounted on arcuate tracks 430 using racks and pinions, the function of which is described below. To adjust the angle of the V-groove, the operator manually rotates handle 410 which results in a relative and equal movement between each frame 430, such that each saw assembly 450 is inclined to an equal and measurable degree so as to result in the formation of an isosceles V-groove being formed in the underside of the integral sheet 12.

For applications where a higher insulation coefficient is required, the insulation sheet 12 will normally be of a greater thickness. Ordinarily in such applications, a commensurate increase in V-groove depth will also be needed. This increased depth may be achieved by vertical adjustment of the subassembly 405 relative frame 20 and hence bed 27. This is accomplished by rotation of height adjustment handle which engages chain 402 and sprocket 403. As noted, subframe 405 threadedly engages gear box 409 secured to frame 20, by a worm and worm gear 404. Thus coupled, rotation of adjustment handle 480 results in a vertical movement of the subframe 430 relative the frame 20, thus varying the penetration of the saw blades 452 into the bottomside of the sheet 12.

While the adjustment to the angle and depth of the V-groove is illustrated and described in terms of manual adjustment, it is understood that these may be arranged and structured to be automatically controlled for adjustment by the microprocessor.

The cutting and grooving operation 400 is also adapted to sever the integral sheet 12 into desired lengths commensurate with the given application. These lengths may be programmed into the microprocessor for automatic operation.

The cut is physically accomplished by saw assembly 450. Referring to FIG. 8, saw assembly 450 is itself comprised of three component parts. The motor 451 is secured to a subframe 462 which itself is hingedly secured to a main frame 463, which as noted, is secured to track 430. Disposed inside of main frame 463 is a pneumatic cylinder 456 which is electrically connected to the microprocessor. This cylinder 456 is oriented for operation in a plane perpendicular to shaft motor 451. When actuated, cylinder 456 moves upward against subframe 462 which pivots about a hinge thereby moving saw motor 451 and accompanying blade 452 upward to result in a complete severance of the sheet 12. Upon completion, cylinder 456 returns to its original position.

The grooved and severed board is then caused to exit cutting and grooving station 400 to a discharge conveyor. As described above, the inward movement of the uncut sheet material into station 400 serves to move the cut material outward onto the discharge conveyor.

Figure 9:
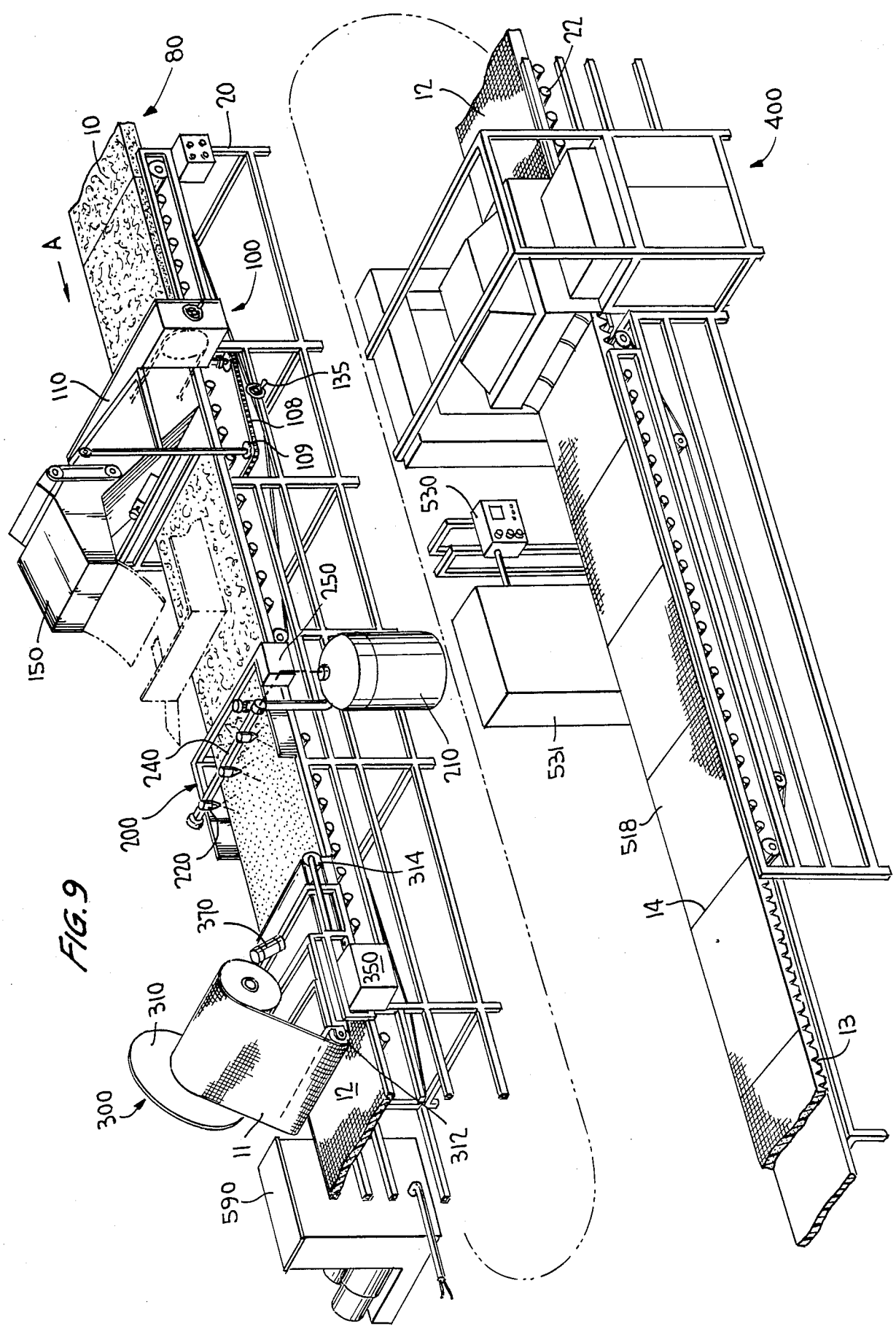
FIG. 9 is a perspective view of a preferred embodiment of the present invention taken in relation to the station sequence of FIG. 1 illustrating a preferred placement of a hydraulic reservoir, microprocessor, electrical enclosure and discharge conveyor.

A second preferred embodiment of the cutting apparatus 500 is best shown in FIGS. 10-13. The V-grooves formed by cutting apparatus 500 is the same as those described in relation to the first cutting apparatus embodiment shown in FIGS. 2, 3, and 8 and described above. Additionally, it is noted that where the cutting assembly 400 is described above in relation to its position and operation within the overall assembly, as best shown in FIGS. 1 and 9, that such description is also applicable with regard to cutting assembly 500. Each cutting apparatus, 400 and 500, is useable in the same manner with regard to the overall multiple station assembly.

As with cutting assembly 400, conveyor bed 27 feeds the sheet material 12 into the cutting apparatus 500 and onto a support means or platform 510 within the apparatus. Further as with cutting assembly 400, a pair of saw assemblies 522 and 527 is situated beneath support means 510. An opening 515 is present in support means 510. Saw blades 520 and 525 of saw assemblies 522 and 527 respectively protrude through this opening during the cutting operation which provides a groove 13 in or severance 14 of the sheet material as best shown in FIGS. 9 and 11. The controlled stepping movement of the conveyor by microprocessor 530 determines the rate of advancement of the sheet material 12 through the cutting apparatus 500. The rate of advancement is determined by the frequency and type of cuts to be made in the sheet material. As with the first preferred embodiment of the cutting apparatus, when the various cuts are completed, the movement of the conveyor pushes additional sheet material forward into the apparatus thereby forcing the cut material outward through the opposite side or exit 540 of the cutting apparatus.

Figure 13:
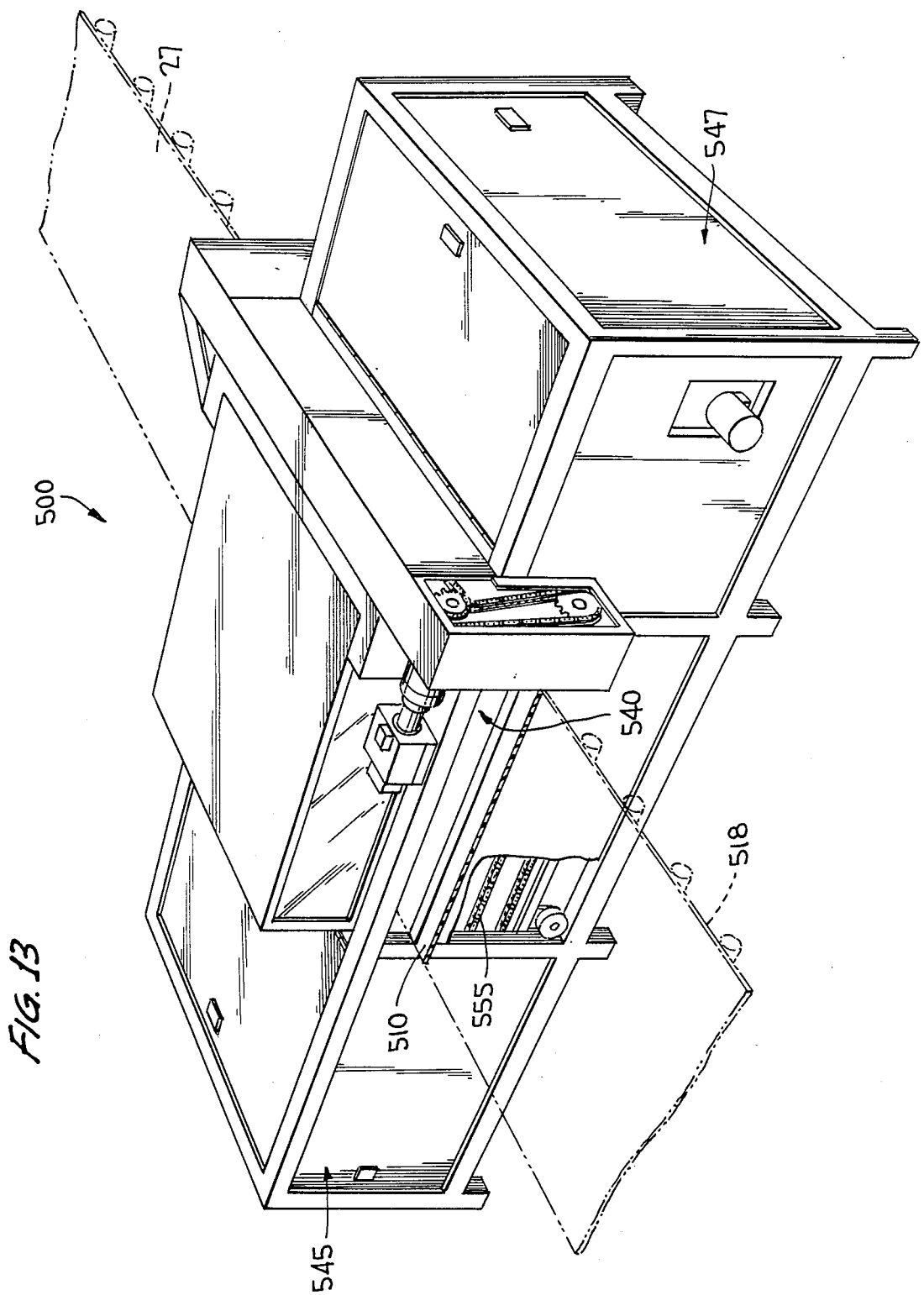
FIG. 13 is a perspective view of the exterior of the second embodiment of the cutting apparatus including a cut-away view of the chain drive assembly.

The pair of saw assemblies 522 and 527 are structured and arranged to move transversely beneath the sheet material on support means 510 to provide a widthwise cut in the sheet material. As shown in FIG. 13, a view of the exterior of the second embodiment of cutting apparatus 500, the support means 510 which abuts a conveyor 518, as shown with phantom lines, is positioned in the central area of the apparatus. Side housings 545 and 547 are positioned on each side of apparatus 500 at a level beneath support platform 510. These housings 545 and 547 provide the work area in which saw assemblies 522 and 527 of the cutting apparatus 500 travel during the cutting operation. As with the first embodiment which has the same basic exterior housing, this allows for the movement of the saw assemblies beyond the perimeter of the sheet material 12 to allow for a finished cut across the complete width of the sheet material and allows free movement of the sheet material.

As further shown in FIGS. 10-11, the second preferred embodiment of saw assemblies 522 and 527 of cutting apparatus 500 includes a platform 550 on which the two saw assemblies 522 and 527 are adjustably mounted in an offset and inclined relationship to each other. The platform 550 is movable by means of rollers 511 along tracks or guide rails 512 formed in or positioned on the interior side walls of housings 545 and 547 beneath the sheet material 12 by means of a flexible loop drive assembly, such as a chain, elastomeric belt or the like. A chain assembly, as best shown in FIG. 10, is preferred and includes two chains 555 and 556. One end of each chain assembly is attached by a suitable means, such as L-shaped bracket 513, to one corner of platform 550 on a first side of the platform as shown in FIG. 10. The second end of each chain is attached to the corners on the opposite side of the platform in the same manner. Chains 555 and 556 each form a loop drive with the use of sprockets 557 and 558. Corresponding sprockets (not shown) are situated in the opposite end of the cutting apparatus to complete the loop system. The chain loop drive moves platform 550 and, accordingly, saw assemblies 522 and 527, in a forward or reverse motion from housing 545 to housing 547 resulting in the transverse movement of saw assemblies 522 and 527 beneath the sheet material. The drive of the chains 555 and 556 which controls the movement of platform 550, is provided by a conventional, electric motor (not shown). The operation of the motor is controlled by the microprocessor and is activated according to the frequency of cuts to be made in the sheet material.

Each saw assembly 522 and 527, which is adjustably mounted on movable platform 550, includes a motor 562A and 562B, a drive shaft 563A and 563B and a blade 520 and 525 which are positioned on an intermediate support 565 and 566. Motors 562A and 562B are preferably hydraulic motors attached to an appropriate hydraulic source by conventional connection means (not shown). The height of intermediate supports 565 and 566 is adjustable by means of screw jacks 560 and 561 respectively which are positioned beneath the front end of supports 565 and 566. When in use, the saw assemblies have a housing, as shown by dashed lines 570 in FIG. 11, placed over the drive shaft 563A and 563B of each saw to maintain the drive shaft free of debris such as sawdust and the like.

A second set of screw jacks 575 and 576 is positioned beneath the rear end of saw supports 565 and 566 respectively. Screw jacks 560 and 561 provide for height adjustment to the saws and, accordingly, the saw blades. Screw jacks 575 and 576 provide for the angular adjustment of saw blades 520 and 525 after the height adjustment by screw jacks 560 and 561 to bring the saw blades back into a proper inclined relationship which is necessary to form a V-groove. Screw jacks 575 and 576 provide for a lateral, i.e. backward or forward motion, adjustment to saw assemblies 522 and 527 thereby affecting the angle of the saw blades and, accordingly, the angle of the groove formed in the sheet material. Pivots are provided at points 578A, 578B, 579A and 579B to allow for movement of platforms 565 and 566 by screw jacks 560, 561, 575, and 576.

In FIG. 11, the relative position of saw blades 520 and 525 is shown in respect to frame 20, platform 510, and sheet material 12 during the formation of a linear groove in sheet material 12.

When the depth and angle of the saw blades 520 and 525 are to be adjusted to provide for a cut or different type of cut in sheet material 12, the height of the saw blades 520 and 525 is either lowered or raised by the pair of screw jacks 560 and 561. If a wider angle is desired, the saws are lowered in height followed by the movement rearward of the saws by the screw jacks 575 and 576 thereby providing realignment of the saw blades in a proper inclined relationship. If a more acute angle is desired, the height of the saws are raised and the screw jacks 575 and 576 are moved forward to provide for the realignment of the saw blades in a proper offset relationship. Since the saw assemblies 522 and 527 are positioned in an offset relationship, either adjustment may be made first since saw blades 520 and 525 do not physically abut as best shown in FIG. 10. In order to sever the sheet material, the depth or height of the blades is adjusted accordingly.

Saw assemblies 522 and 527 preferably have a pleated covering or bellows, shown by dashed lines 580 in FIG. 11, positioned over screw jacks 560 and 561 to keep debris, such as sawdust or the like, from accumulating thereon and possibly impairing operation of the mechanism.

A hydraulic reservoir 590, as shown generally in FIG. 9, is provided for attachment to cutting apparatus 500 to maintain proper hydraulic pressure within appropriate parts of saw assemblies 522 and 527. The structure and function of the hydraulic reservoir is conventional in nature.

As described above with respect to the first embodiment of the cutting apparatus, the second preferred embodiment of the cutting apparatus can be used in conjunction with a collection and removal system as known in the art. The system provides for the removal of the pieces of cut board material, sawdust, etc. which necessarily result from the cutting operation.

As with the other stations of the insulation board forming assembly as described above, microprocessor located in electrical enclosure 531 controls the operation of the cutting apparatus 500, i.e. the frequency and type of cuts to be made. The programmed operation of the cutting apparatus by the microprocessor in turn determines the operation of the other stations involved in the assembly production. As described above, the cutting apparatus requires a temporary stoppage in the movement of the sheet material to cut a groove in or to sever the sheet material. Accordingly, the conveyor movement must be coordinated with the cutting operation. In turn when the conveyor is stopped during the cutting operation, the operation of the other treatment stations in the overall production assembly must be controlled in a corresponding manner in order to prevent the continual treatment on a particular area of the sheet material. For example, the microprocessor controls the adhesive spray operation so that its activation is in timed sequence with the movement of sheet material on the conveyor thereby preventing an uneven buildup of adhesive over a particular area of the sheet material which would necessarily result when the conveyor stops if the spray is not interrupted. Accordingly, the microprocessor programs the conveyor and cutting apparatus in view of the spacing and type of cuts desired and programs the operation of the additional treatment stations of the assembly so that their operation is coordinated in relation to the movement of the sheet material by the conveyor.

As shown in FIGS. 9 and 12, loader/monitor 530 is preferably positioned on a support frame of the assembly to provide easy access to the assembly operator. The microprocessor structure can be any structure known in the art which is capable of being programmed to control the operation of a plurality of mechanical apparatus. An electrical enclosure 531 is present for containing the microprocessor, electric circuits, etc., which are necessary for the operation of the entire assembly.

As will be apparent to one skilled in the art, various modifications can be made within the scope of the aforesaid description. Such modifications being within the ability of one skilled in the art form a part of the present invention and are embraced by the appended claims.

It is claimed:

1. An apparatus for the fabrication of grooved lengths of insulation material from sectional lengths of such material, said apparatus comprising in combination:
   a frame;
   a conveyor system disposed along the frame and adapted to travel in a longitudinal direction;
   feeding means situated at an upstream end of the conveyor system, and adapted to place sectional insulation lengths in an end-to-end, abutting relationship on the belt;

a planing means disposed above and secured to said frame downstream from said feeding means, said planing means adapted to establish a desired thickness in said lengths as the lengths move longitudinally along said frame;

a spraying system positioned along said frame above the belt, and adapted to apply an adhesive coating over the upper, exposed surface of said lengths of insulation material as they move downstream from said planing means;

a backing device situated downstream from said spraying system and in transversely movable relation to said frame, said backing device comprising a backing spool and a contact arm arranged to position backing from said spool onto the upper surface of said insulation sheet in such a manner that the combination backing material and abutting insulation sections form a continuous integral sheet;

a grooving means slidably disposed in a lateral direction relative to said frame and beneath the level of said belt, said grooving means constructed and arranged to form a series of lateral grooves or notches in the underside of said integral sheet as it progresses longitudinally down said frame and comprising means for supporting said integral sheet during formation of said lateral grooves;

movable unitary support means capable of moving laterally beneath said support means for said integral sheet; and a pair of saw assemblies adjustably mounted on said movable unitary support in an offset inclined relationship to each other; and a microprocessor assembly adapted to control the movement of said insulation lengths through said apparatus.

2. The apparatus according to claim 1 wherein said planing means comprises a band saw laterally situated across said conveyor at a variable height.

3. The apparatus according to claim 1 wherein said feeding means has a means capable of adhering the ends of the sectional lengths of the material.

4. The apparatus according to claim 1 wherein said planing means includes automatic means to remove dust or trimmings from said assembly.

5. The apparatus according to claim 4 wherein said removal means comprises a conveyor and vacuum removal system.

6. The apparatus according to claim 1 wherein said backing means includes an automatic means for ensuring an exact juxtaposition of the backing over the insulation sheet.

7. An apparatus according to claim 1 wherein said movable unitary support means of said grooving means comprises a platform connected to a flexible loop drive assembly.

8. An apparatus according to claim 1 wherein said lateral grooves formed in said integral sheet are in the shape of a V-groove.

9. An apparatus according to claim 1 wherein said lateral grooves in said integral sheet extend through said insulation material of said integral sheet and not through said backing of said integral sheet.

10. An apparatus according to claim 1 wherein said adjustable mounting of said saw assemblies of said grooving means comprises an arcuate track system and saw assemblies displaced by racks and pinions.

11. An apparatus according to claim 1 or claim 10 wherein said adjustable mounting is adapted to control the depth of said lateral grooves in said integral sheet.

12. An apparatus according to claim 8 or claim 9 wherein one of said saw assemblies of said grooving means is structured and arranged to cut a first side to an acute angle in said integral sheet and the other of said saw assemblies is structured and arranged to cut a side of an acute angle which is complementary to said first cut acute angle side.

13. An apparatus according to claim 1 wherein said saw assemblies of said grooving means have circular saw blades.

14. Apparatus for increasing the flexibility of a length of inflexible insulation, which comprises:

a conveyor to convey lengths of inflexible insulation along a linear path;

an applicator to apply continuously and automatically a layer of backing to a first side of said lengths of inflexible insulation as such lengths progress along said path; and a notcher at a position along the linear path subsequent to said backing applicator adapted to receive the backed lengths of insulation and form linear notches in the non-backed side of said lengths and entirely across said lengths without severing the backing, said notcher comprising a means for supporting said backed lengths;

a movable unitary support means capable of moving transversely beneath said support means for said backed lengths; and a pair of saw assemblies adjustably mounted on said movable unitary support means in an offset inclined relationship to each other.

15. The apparatus according to claim 14 wherein said saw assemblies have circular saw blades.

16. The apparatus according to claim 14 wherein the saw assemblies are movably positioned relative to each other such that notches of variable angulation may be achieved.

17. The apparatus according to claim 14 which further comprises a planer assembly positioned on the linear path in advance of the notcher and adapted to receive and reduce the thickness of the lengths of inflexible insulation material.

18. The apparatus according to claim 17 wherein the planer assembly comprises a band saw or reciprocating saw.

19. The apparatus according to claim 18 wherein the planer assembly is adjustable to variably reduce the thickness of said lengths.

20. The apparatus according to claim 14 which further comprises an apparatus to remove trimmings from the assembly.

21. An apparatus according to claim 14 wherein said movable unitary support means of said notcher comprises a platform connected to a flexible loop drive assembly.

22. An apparatus according to claim 14 wherein said linear notches in said backed lengths are in the shape of V-grooves.

23. An apparatus according to claim 14 further comprising a microprocessor adapted to control said apparatus.

24. An apparatus according to claim 14 wherein said adjustable mounting of said saw assemblies of said notcher comprises a combination of arcuate tracks and racks and pinions.

25. An apparatus according to claim 14 or claim 24 wherein said adjustable mounting of said saw assemblies is structured and arranged to control the depth of said linear notches in said backed lengths.

26. An apparatus in accordance with claim 22 wherein one of said saw assemblies is structured and arranged to cut a first side to an acute angle in said backed lengths and the other of said saw assemblies is structured and arranged to cut a side of an acute angle which is complementary to said first cut acute angle side.

27. An apparatus according to claim 14 or claim 26 wherein said saw assemblies have circular saw blades.

28. An apparatus according to claim 23 wherein said microprocessor is capable of controlling in coordination with said apparatus at least one additional insulation material treatment station.

29. An apparatus according to claim 28 wherein said additional insulation treatment station is a planing means.

30. An apparatus according to claim 28 wherein said additional insulation material treatment station is an adhesive spraying means.

31. Apparatus for forming cuts in a rigid sheet material comprising:
a means for supporting a rigid sheet material;
a movable support means capable of moving transversely beneath said support means for said rigid sheet material; and
a pair of saw assemblies mounted on said movable support means in an offset inclined relationship to each other, said saw assemblies including adjustment means for raising and lowering the saws of said saw assembly and moving the saws forward and rearward, whereby when said saw assemblies are operated in unison and said movable support means is caused to move beneath said support means for said sheet material, said saw assemblies will form a predetermined cut in said rigid sheet material positioned above said saw assemblies.

32. An apparatus according to claim 31 wherein said adjustment means comprises a pair of arcuate tracks.

33. An apparatus according to claim 31 wherein said movable support means comprises a platform connected to a flexible loop drive assembly.

34. An apparatus according to claim 31 wherein said cut in said sheet material is in the shape of a V-groove.

35. An apparatus according to claim 31 wherein said cut severs said rigid sheet material at pre-programed intervals.

36. An apparatus according to claim 31 wherein said rigid sheet material has a backing attached thereto.

37. An apparatus according to claim 36 wherein said cut in said rigid sheet material is in the shape of a V-groove and said cut extends through said rigid sheet material and not through said backing.

38. An apparatus according to claim 31 further comprising a microprocessor.

39. An apparatus according to claim 31 wherein said adjustment means of said saw assemblies comprises a combination of arcuate tracks and racks and pinions.

40. An apparatus according to claim 31 or claim 39 wherein said adjustment means of said saw assemblies is structured and arranged to control the depth of said cut in said rigid sheet material.

41. An apparatus according to claim 32 wherein said arcuate tracks are constructed and arranged to control the angle of said cut formed in said rigid sheet material.

42. An apparatus according to claim 31 which further comprises an automatic sheet material feed means.

43. An apparatus according to claim 42 which further comprises a microprocessor capable of simultaneously controlling (1) the type of cut and frequency of cut formed in said rigid sheet material and (2) said feed means.

44. An apparatus according to claim 34 or claim 37 wherein one of said saw assemblies is constructed and arranged to cut a first side to an acute angle in said rigid sheet material and the other of said saw assemblies is constructed and arranged to cut a side of an acute angle which is complementary to said first cut acute angle side.

45. An apparatus according to claim 31 wherein said saw assemblies have circular saw blades.

46. An apparatus according to claim 38 or claim 43 wherein said microprocessor is programmed to control coordination with said apparatus at least one additional rigid sheet material treatment station.

47. An apparatus according to claim 46 wherein said additional rigid sheet material treatment station is a planing means.

48. An apparatus according to claim 47 wherein said additional rigid sheet material treatment station is a backing means.

49. An apparatus according to claim 48 wherein said additional rigid sheet material treatment station is an adhesive spraying means.

50. An apparatus according to claim 12 wherein said saw assemblies of said grooving means have circular saw blades.

51. An apparatus according to claim 44 wherein said saw assemblies have circular saw blades.

* * * * *